Figure 1:
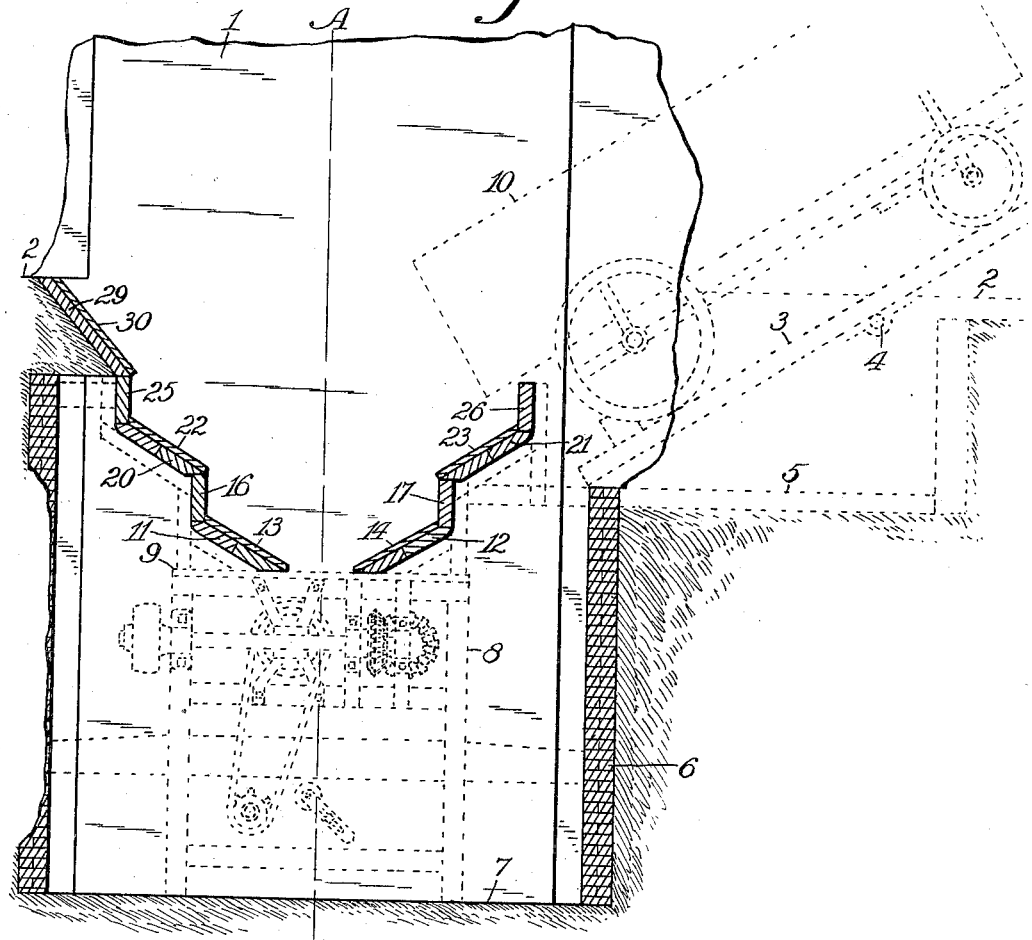

J. D. HOFFA.
DUMPING SINK.
APPLICATION FILED APR. 21, 1913.

1,089,130.

Patented Mar. 3, 1914.
2 SHEETS—SHEET 1.

WITNESSES:
J. H. Gardner.
M. L. Wilhelm.

INVENTOR:
John D. Hoffa,
BY E. T. Silvius,
ATTORNEY.

COLUMBIA PLANOGRAPH CO., WASHINGTON, D. C.

J. D. HOFFA.
DUMPING SINK.
APPLICATION FILED APR. 21, 1913.
1,089,130.
Patented Mar. 3, 1914.
2 SHEETS—SHEET 2.
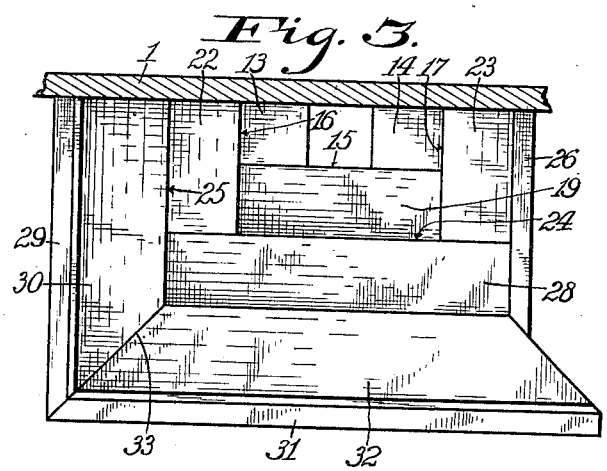
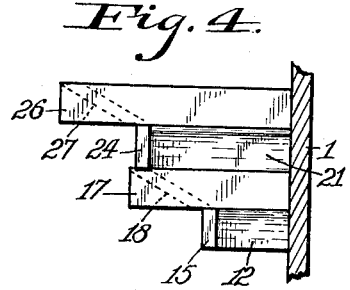
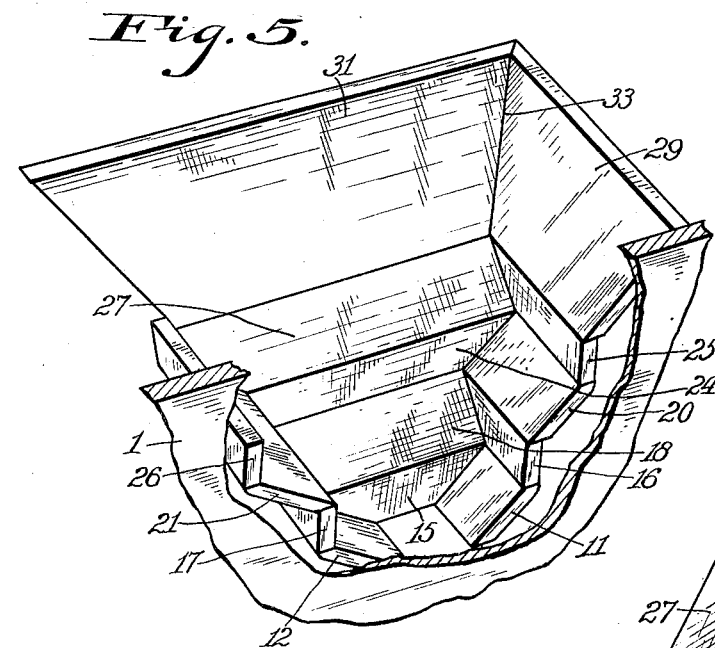
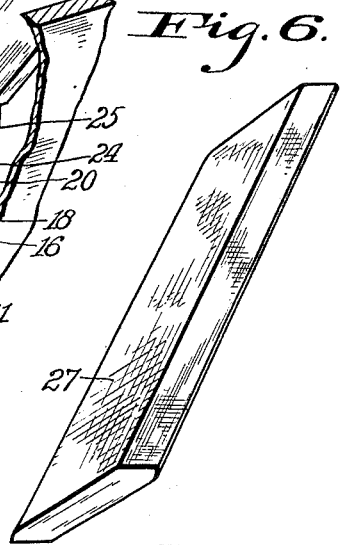
WITNESSES:
J. H. Gardner
M. L. Wilhelm
INVENTOR:
John D. Hoffa,
BY E. T. Silvius,
ATTORNEY.

UNITED STATES PATENT OFFICE.

JOHN D. HOFFA, OF CRAWFORDSVILLE, INDIANA.

DUMPING-SINK.

1,089,130. Specification of Letters Patent. Patented Mar. 3, 1914.

Application filed April 21, 1913. Serial No. 762,612.

*To all whom it may concern:*

Be it known that I, JOHN D. HOFFA, a citizen of the United States, residing at Crawfordsville, in the county of Montgomery and State of Indiana, have invented a new and useful Dumping-Sink, of which the following is a specification, reference being had to the accompanying drawings and to the letters and figures of reference marked thereon.

This invention relates to a device having the general characteristics of a hopper, chute or funnel for receiving bulk substance and guiding the same into a relatively small receptacle or aperture, the invention having reference more particularly to a device of the above indicated character that is used in connection with corn shellers at grain elevators and commonly known as a dumping sink into which ear corn may be dumped from wagons and fed into a large corn sheller from which the shelled corn is received into an elevator.

Dumping sinks as hitherto constructed are hopper-shaped, the inclined sides of which are straight so that unbroken valleys are formed at the corners where the sides are joined together with the result that ear corn packs in the lower portion so as to prevent free feeding into the corn sheller, the corn forming practically an arch which requires the services of an attendant to break up so as to permit the corn to feed down into the sheller.

An object of the invention is to provide an improved dumping sink or hopper that shall be so constructed as to prevent packing of lump substance therein and therefore insure free and uninterrupted feeding of the substance therethrough, to the end that the expense of an attendant shall be saved or avoided.

A specific object of the invention is to provide an improved dumping sink for use in connection with elevators whereby ear corn may be received in bulk from wagons or other means of conveyance and freely fed into the corn sheller without entailing the expense of an attendant, and permitting wagons to be quickly unloaded in succession.

A still further object of the invention is to provide a relatively inexpensive, reliable, durable and economical dumping sink of the above mentioned character which shall be so constructed as to be adapted for receiving and feeding various lump substances such as coal, bricks or stones.

With the above mentioned and other objects in view, the invention consists in a hopper-like device having sides comprising sloping or inclined portions and also approximately vertical portions, and the invention consists further in the parts and combinations and arrangements of parts as hereinafter particularly described and further pointed out in the accompanying claims.

Figure 2:
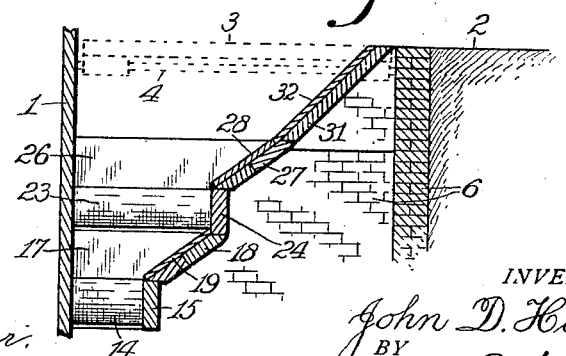

Referring to the drawings, Figure 1 is a vertical section of the improved dumping sink and fragmentary side elevation of an elevator, a corn sheller being indicated by dotted lines in a pit beneath the sink or hopper, a wagon being indicated also in dotted lines in the usual position for dumping a load into the sink; Fig. 2 is a fragmentary transverse section on the plane of the line A A in Fig. 1; Fig. 3 is a top plan of the dumping sink as preferably constructed; Fig. 4 is an end elevation of the sink; Fig. 5 is a perspective view of the sink structure at one side of the elevator, the latter being broken away; and Fig. 6 is a perspective view of one of the parts of the sink.

Similar reference characters in the different figures of the drawings indicate corresponding elements or features of construction herein referred to and described.

As preferably constructed the dumping sink is built onto the exterior of a vertical side 1 of an elevator, the wall of the elevator therefore conveniently forming one side of the sink or hopper, the sink being below the plane of the ground surface 2 on which a platform 3 is supported by means of a trunnion or shaft 4, so as to tilt and permit one end of the platform to descend into a shallow pit 5, which extends to a deeper pit 6 on the bottom 7 of which is a corn sheller 8 having its top 9 suitably constructed so as to receive ear corn to be shelled, all of which is well known and will be readily understood, and when the ear corn is delivered to the elevator by means of a wagon 10 the wagon is placed upon the platform 3 after which the platform is tilted to permit the corn to fall out of the rear end of the wagon bed into the sink or hopper, the dumping position of the wagon being indicated in Fig. 1.

The sink or hopper comprises two inclined slides 11 and 12 suitably spaced apart at their lower ends so as to guide the ear corn into the corn sheller from the top of which the slides extend upward and away divergently, and preferably are provided on their tops with metallic facing plates 13 and 14 respectively. A side board or riser 15 is arranged with its bottom on the plane occupied by the bottoms of the slides 11 and 12 and it extends upward vertically and also horizontally to or beyond the ends of the slides parallel to the upright side 1 of the elevator. Two other side boards or risers 16 and 17 extend upward vertically from the tops of the slides 11 and 12 respectively and from the side 1 of the elevator at right angles thereto, being in contact with said side. A slide 18 extends upward from the top of the side board 15 and away from the side 1 of the elevator, and to or beyond the ends of the side boards 16 and 17, and it has a face plate 19 thereon for its protection. Two slides 20 and 21 extend upward divergently from the tops of the side boards 16 and 17 and also abut the side 1 of the elevator and extend therefrom to the farther ends of the side boards, and preferably are provided on the tops with face plates 22 and 23 respectively.

A side board or riser 24 extends upward vertically from the top of the slide 18 opposite to the side 1 of the elevator and horizontally to or beyond the slides 20 and 21. Two side boards or risers 25 and 26 extend upward vertically from the tops of the slides 20 and 21 respectively. Another slide 27 extends upward from the top of the side board or riser 24 and outward in inclined position, diverging from the plane of the side 1 of the elevator, and it preferably has a protecting face plate 28 thereon and extends from the side board 25 to the side board 26. It will be seen that the side boards or risers 25 and 26 are spaced farther apart than the side boards 16 and 17; also that the slides 20 and 21 are spaced farther apart than the slides 11 and 12; that the side board 24 is farther than the side board 15 from the side 1 of the elevator, and that the slide 27 is farther away than the slide 18 from the side of the elevator, so that the general contour corresponds approximately to that of a hopper but that the different portions of the sides differently shaped occupy different horizontal planes and that in the space between each two planes only two sides are sloping, or as shown in one or more planes one side only is sloping, the remaining sides being vertical so as to induce a sheer drop for the ear corn. The sides may be continued upward indefinitely as above described so as to provide the desired width of mouth at the top, the arrangement indicated being such as to be convenient for permitting the wagon body to extend slightly over the top of the side board 26, and in order to prevent the corn from rolling out upon the adjacent ground and also to afford ample width at the top, a sloping slide board 29 is placed upon the side board or riser 25 and preferably provided with a protecting face plate 30 extending from the side 1 of the elevator a suitable distance. Another inclined slide board 31 is placed upon the slide 27 and extends upward and away from the plane of the side 1 of the elevator, being preferably provided with a protecting face plate 32, the adjacent ends of the slides 29 and 31 being mitered and joined together so as to form a valley 33 in which, however, there cannot in ordinary usage be sufficient corn placed to cause packing and clogging of the mouth of the sink or hopper.

It should be understood that in some cases instead of utilizing the vertical side of the elevator to constitute one side wall of the sink or hopper, in lieu thereof a side obviously may be made to correspond to the stepped side described as being opposite to the said side 1. The sink or hopper obviously may be covered by a suitable lid when not in use, such device being omitted in the illustration in order to avoid confusion.

In practical use the substance to be passed through the sink or hopper may be placed therein intermittently in large quantities or in some cases may be delivered continuously, and while the weight of the bulk tends to cause packing and prevent free sliding of the substance downward against the sloping sides of the sink or hopper, the lumpy substance or ears of corn pass through the space between the slides 11 and 12, but while there is a tendency to lodge thereon, those ears or lumps adjacent to the vertical sides 1 and 15 cannot lodge against the vertical surfaces but must fall through, leaving space into which other particles must gravitate and pass through. Similar action occurs in the succeeding planes above so that constant movement induced by the vertical sides takes place, with the result that choking resulting from packing and bridging is prevented.

Having thus described the invention, what is claimed as new is—

1. A dumping sink including a plurality of side walls, each wall comprising a plurality of inclined portions and a plurality of vertical portions arranged alternatively, the inclined portions of one side wall being on one and the same horizontal planes with the vertical portions of the next adjacent wall and connected thereto.

2. A dumping sink including a vertical wall, a plurality of pairs of inclined slides joined to and extending from the vertical wall on different horizontal planes, each pair being on a separate plane, the two slides of each pair being spaced apart and extending divergently upward, a plurality of pairs of side boards extending vertically upward from the top of one pair to the bottom of the adjacent pair of slides respectively and joined thereto and to the vertical wall, a plurality of vertical side boards opposite to the vertical wall and extending respectively from the end of one to the end of the remaining one of a pair of slides, and a plurality of inclined slides spaced apart opposite to the vertical wall and extending respectively from one to the remaining one of a pair of vertical side boards between the slides that are opposite the vertical side wall.

3. A dumping sink including a vertical wall, two sloping slides joined to and extending from the vertical wall, the slides being spaced apart and extending divergently upward, a side board extending vertically upward from the plane of the bottoms to the plane of the tops of the slides opposite to the vertical wall and joined to the slides, a single slide upon the side board and extending upward opposite to and in direction away from the vertical wall, a wall portion upon the last described slide, two side boards upon the two sloping slides respectively and extending vertically and from the vertical wall to the single slide, and two wall portions upon the two side boards extending from the vertical wall to the first-described wall portion.

In testimony whereof, I affix my signature in presence of two witnesses.

JOHN D. HOFFA.

Witnesses:
ANTOINETTE BANKS,
CHARLES W. ROSS.

---

Copies of this patent may be obtained for five cents each, by addressing the "Commissioner of Patents, Washington, D. C."